United States Patent [19]

Bolton

[11] Patent Number: 4,889,267
[45] Date of Patent: Dec. 26, 1989

[54] COOLER CADDY FOR GOLF CART

[76] Inventor: David R. Bolton, 2670 Amy La., Apt. #1, Memphis, Tenn. 38128

[21] Appl. No.: 189,393

[22] Filed: May 2, 1988

[51] Int. Cl.[4] .............................................. B60R 9/00
[52] U.S. Cl. .................... 224/274; 224/42.43; 224/42.33; 280/DIG. 6
[58] Field of Search ................. 224/274, 42.32, 42.43, 224/42.46 R, 42.44, 42.45 R, 42.41, 42.33, 42.34, 42.35, 96, 98; 280/DIG. 5, DIG. 6

[56] References Cited

U.S. PATENT DOCUMENTS

| 4,452,468 | 6/1984 | Eads et al. | 248/98 |
| 4,459,827 | 7/1984 | Rhodes | 224/174 |
| 4,550,930 | 11/1985 | Proffit | 224/174 |

Primary Examiner—Henry J. Recla
Assistant Examiner—Edward C. Donovan
Attorney, Agent, or Firm—Walker & McKenzie

[57] ABSTRACT

A cooler caddy for mounting a beverage cooler to a pull-type golf cart. The caddy includes holder structure for holding the cooler; and attachment structure for removably attaching the holder structure to the golf cart.

9 Claims, 1 Drawing Sheet

COOLER CADDY FOR GOLF CART

BACKGROUND OF THE INVENTION

1. Field of the Invention

The present invention relates, in general, to a caddy for supporting a beverage cooler or the like on a pull-type golf cart.

2. Description of the Related Art

A preliminary patentability search conducted in class 224, subclass 274 disclosed the following patents: U.S. Pat. Nos. 4,459,827 to Rhodes and Proffit, 4,550,930. Rhodes discloses a golf bag cooler kit including a belt for being secured directly to a golf bag. Proffit discloses a pull-type golf cart having a support table pivotally mounted thereto for supporting a cooler. Neither of the above patents disclose or suggest the present invention.

SUMMARY OF THE INVENTION

The present invention is directed toward providing a cooler caddy for mounting a beverage cooler to a pull-type golf cart. The caddy includes holder means for holding the cooler; and attachment means for removably attaching the holder means to the golf cart.

DESCRIPTION OF THE PREFERRED EMBODIMENT

Figure 1:
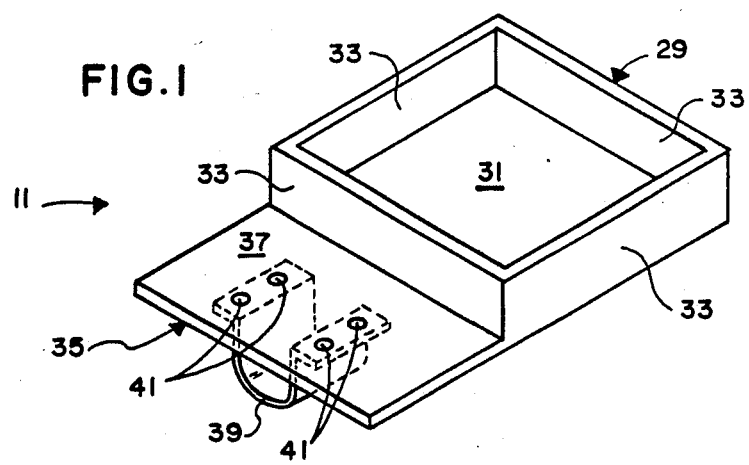
FIG. 1 is a perspective view of the cooler caddy of the present invention.
Figure 2:
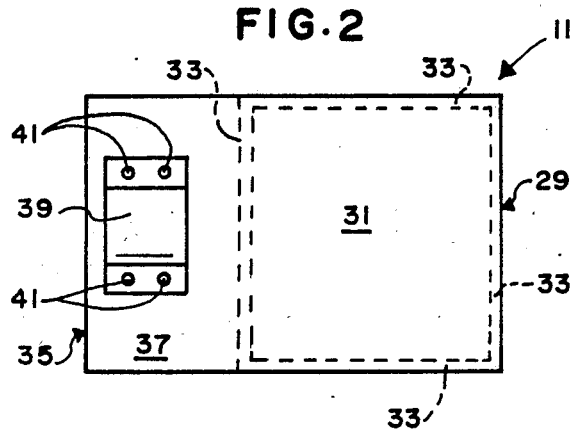
FIG. 2 is a bottom plan view thereof.
Figure 3:
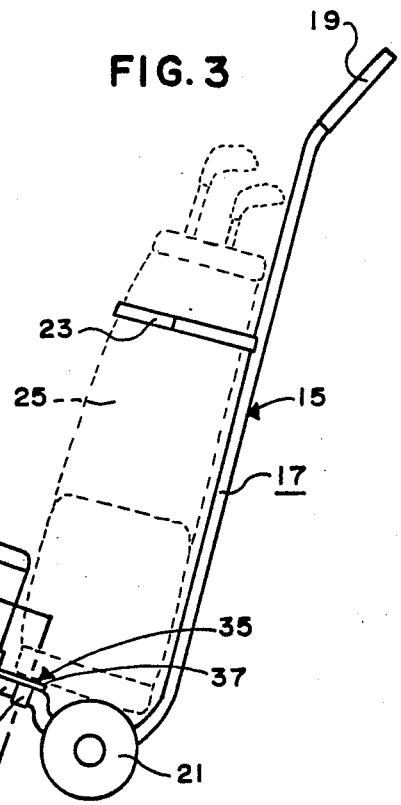
FIG. 3 is a side elevational view thereof shown mounting a beverage cooler to a golf cart having a golf bag secured thereto.
Figure 4:
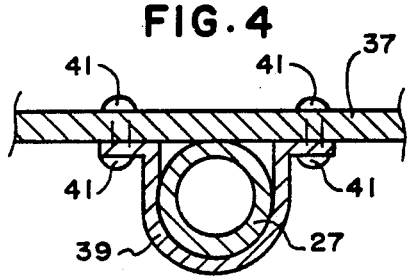
FIG. 4 is an enlarged sectional view substantially as taken on line IV—IV of FIG. 3 with portions omitted for clarity.

The cooler caddy 11 of the present invention is used to mount a typical beverage cooler 13 to a typical pull-type golf cart 15 whereby a golfer can enjoy a cool beverage while playing a round of golf, etc. The cooler 13 preferably consists of a small, lightweight plastic cooler for holding a six-pack of beverages or the like, along with an appropriate cooling medium as will now be apparent to those skilled in the art. The golf cart 15 typically includes an elongated body 17 having a handle 19 at the upper end thereof and having wheels 21 at the lower end thereof, and securing means 23, such as belts or the like, for removably securing a golf bag 25 to the golf cart 15. The lower end of the body 17 commonly includes an outwardly extending protrusion 27 on which at least a portion of the golf bag 25 typically rests.

The caddy 11 includes holder means 29 for holding the cooler 13. The holder means 29 preferably includes an open-top box structure having a bottom member 31 and a plurality of side members 33 extending upwardly from the bottom member 31. THe holder means 29 is preferably designed so that the cooler 13 can be frictionally attached thereto. Thus, for example, the side members 33 may be spaced from one another a distance so that the cooler 13 will spring opposite side members 33 apart from one another when inserted into the holder means 29 whereby the cooler 13 will be securely held by the caddy 11. The holder means 29 preferably includes four side members 33 whereby the holder means 29 defines an open-top box-like structure.

Figure 5:
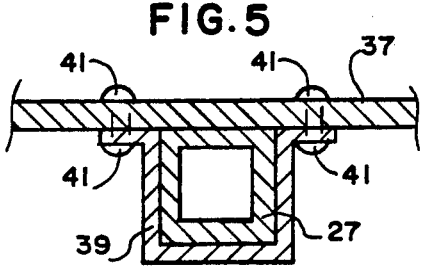
FIG. 5 is a sectional view similar to FIG. 4 but showing a modified construction.

The caddy 11 includes attachment means 35 for removably attaching the holder means 29 to the golf cart 15. The attachment means 35 preferably includes a lip or extension member 37 extending outward from the bottom member 31 of the holder means 29 for being positioned between the bottom of the golf bag 25 and the protrusion 27 of the golf cart 15, as clearly shown in FIG. 3, to securely hold the caddy 11 to the golf cart 15. The attachment means 35 preferably includes bracket means 39 for slidably receiving the protrusion 27 of the golf cart 15 and for securing the caddy 11 to the protrusion 27. The specific shape of the bracket means 39 may vary depending on the specific design of the protrusion 27. Thus, the bracket means 39 shown in FIGS. 1-4 is specifically designed for a protrusion 27 having a circular cross sectional shape while the bracket means 39 shown in FIG. 5 is specifically designed for a protrusion having a square cross sectional shape. The bracket means 39 is preferably attached to the underneath side of the extension member 37.

The specific construction of the caddy 11 may vary as will now be apparent to those skilled in the art. Thus, for example, the holder means 29 and extension membr 37 may be constructed out of sheet metal as an integral unit and the bracket means 39 may be formed out of sheet metal and attached to the underneath side of the extension member 37 by typical rivets 41 or the like. On the other hand, the cooler 13, holder means 29 and attachment means 35 may be constructed as a one-piece integral unit out of molded plastic or the like as will now be apparent to those skilled in the art. The specific size and shape of the caddy 11 will depend on the specific coller 13 and golf cart 15 the caddy 11 is to be used with as will now be apparent to those skilled in the art.

Although the present invention has been described and illustrated with respect to a preferred embodiment and a preferred use therefor, it is not to be so limited since modifications and changes can be made therein which are within the full intended scope of the invention.

I claim:

1. A cooler caddy in combination with a beverage cooler, a golf bag having a bottom, and a golf cart having an outwardly extending protrusion for extending beneath said bottom of said golf bag, said caddy comprising:
   (a) holder means for holding said cooler, said holder means including an open-top box structure having a bottom member; and
   (b) attachment means for removably attaching said holder means to said golf cart, said attachment means including an extension member extending outward from said bottom member of said holder means for being positioned between said bottom of said golf bag and said protrusion of said golf cart with said bottom of said golf bag resting directly on said extension member to clamp said extension member between said bottom of said golf bag and said protrusion of said golf cart to securely hold said caddy to said golf cart.

2. The caddy of claim 1 in which said open-top box structure of said holder means has a plurality of side members extending upwardly from said bottom member.

3. The caddy of claim 2 in which said holder means is designed so that said cooler is frictionally attached thereto.

4. The caddy of claim 2 in which said side members are spaced from one another a distance so that said cooler will spring opposite ones of said side members apart from one another when inserted into said holder means whereby said cooler will be securely held by said caddy.

5. The caddy of claim 2 in which said holder means includes four side members.

6. The caddy of claim 2 in which said attachment means includes bracket means for slidably receiving said protrusion of said golf cart and for securing said caddy to said protrusion.

7. The caddy of claim 6 in which said bracket means defines an aperture having a substantially circular cross sectional area.

8. The caddy of claim 6 in which said bracket means defines an aperture having a substantially square cross sectional area.

9. The caddy of claim 6 in which said bracket means is attached to the underneath side of said extension member.

* * * * *